United States Patent [19]

Kurtz

[11] Patent Number: 5,112,592
[45] Date of Patent: May 12, 1992

[54] PROCESS FOR CURING BICARBONATES

[75] Inventor: Andrew D. Kurtz, Somerville, N.J.

[73] Assignee: Church & Dwight Co., Inc., Princeton, N.J.

[21] Appl. No.: 716,813

[22] Filed: Jun. 17, 1991

[51] Int. Cl.[5] .............................................. C01B 31/24
[52] U.S. Cl. ................................ 423/419 R; 423/421; 423/422; 423/425
[58] Field of Search ................... 423/203, 209, 419 R, 423/421, 422, 425

[56] References Cited

U.S. PATENT DOCUMENTS

| | | | |
|---|---|---|---|
| 276,990 | 5/1883 | Carey et al. | 423/422 |
| 574,089 | 12/1896 | Hawliczek | 423/422 |
| 835,771 | 11/1906 | Behrens | 423/422 |
| 3,647,365 | 3/1972 | Saeman | 423/422 |
| 4,151,266 | 4/1979 | Robey et al. | 423/425 |
| 4,459,272 | 7/1984 | Krieg et al. | 423/422 |
| 4,664,893 | 5/1987 | Sarapata et al. | 423/422 |
| 4,919,910 | 4/1990 | Kurtz et al. | 423/422 |

Primary Examiner—Gary P. Straub
Assistant Examiner—Stephen G. Kalinchak
Attorney, Agent, or Firm—Bryan, Cave, McPheeters & McRoberts

[57] ABSTRACT

A process for reducing the amount of residual carbonate on alkali metal bicarbonates which comprises:
(a) feeding a dry bicarbonate into a reaction zone,
(b) admixing the bicarbonate with carbon dioxide gas saturated with water vapor at a temperature $T_1$,
(c) controlling the temperature $T_1$ so that it exceeds temperature $T_2$ of the carbon dioxide gas exiting the reaction zone by just enough to condense a controlled amount of water vapor sufficient to accomplish the reaction,
(d) and reacting the bicarbonate, carbon dioxide, and condensed water vapor, for a sufficient time to produce dry cured bicarbonate product with less carbonate content.

8 Claims, 1 Drawing Sheet

PROCESS FOR CURING BICARBONATES

BACKGROUND OF THE INVENTION

Virtually all bicarbonates which are produced by crystallization from a carbonating vessel have traces of carbonate reactant on the crystal surfaces of the product bicarbonate (e.g., sodium bicarbonate and potassium bicarbonate). Eliminating residual carbonate is beneficial to reduce the tendency of the bicarbonate to form lumps and to meet some customer purity requirements. However, known ways to remove the residual carbonate are costly or inefficient.

PRIOR ART

The process of converting the residual carbonate on the bicarbonate to additional bicarbonate product is known in the industry as "curing." Curing, of course, increases the purity of the bicarbonate product. Bicarbonate salts, particularly sodium bicarbonate, were formerly cured in bins with dry $CO_2$. However, the reaction took days and even then remained incomplete.

Hawliczek's U.S. Pat. No. 574,089, granted Dec. 29, 1896, discloses the treatment of a crude sodium bicarbonate first with steam to hydrate it and then with carbon dioxide. Behrens' U.S. Pat. No. 835,771, granted Nov. 13, 1906, describes a vapor phase process for the manufacture of sodium bicarbonate by treating anhydrous sodium carbonate with a gaseous mixture containing equimolar proportions of carbon dioxide and steam. To avoid condensation of the steam, Behrens described carrying out his reaction under elevated pressures and in the presence of nitrogen.

Gaseous phase, dry carbonation techniques have been disclosed for the production of alkali metal bicarbonates. Many dry carbonation processes involve the addition of liquid water, which can only be added at some risk of over-wetting. For example, Krieg et al. U.S. Pat. No. 4,459,272, owned by the assignee of the present invention, describes a dry carbonation in which liquid water is added to the reaction medium to increase the reaction rate and control the reaction temperature. On the other hand, Sarapata et al. U.S. Pat. No. 4,664,893, also owned by the assignee of the present invention, discloses a process for the preparation of a bicarbonate sorbent in flue gas desulfurization, utilizing a flue gas stream containing from 6 to 17% carbon dioxide and having a relative humidity of at least 90%.

It has long been known to produce potassium bicarbonate in solution from potassium chloride, potassium carbonate or other reactants. See, for example, U.S. Pat. Nos. 1,254,521; 1,400542; 1,636,710; 2,752,222; 2,768,060; 2,782,093; 2,837,404; 2,903,337; 3,111,379; 3,141,730; 3,158,440; 3,189,409; 3,347,623; and 4,010,243.

U.S. Pat. No. 4,919,910 describes the dry carbonation of potassium carbonate to produce potassium bicarbonate, in which the relative humidity of the carbon dioxide stream to the reactor is controlled at from 40 to 70%. In the present invention, the carbon dioxide stream to the reaction zone is saturated with water vapor. In the invention, one controls the drop in temperature between the temperature of the carbon dioxide saturated with water vapor entering the reactor and the temperature of the humid carbon dioxide exiting the reaction zone, thereby condensing the stoichiometric amount of water required for curing. The procedure of U.S. Pat. No. 4,919,190 will not work for the curing of sodium bicarbonate because the sodium carbonate impurity is not deliquescent as is potassium carbonate. In addition, it is stated in U.S. Pat. No. 4,919,910, "Above 75% RH, the carbonation goes to completion but the product formed is difficult to handle and must be dried." [See col. 2, lines 45-47.] It is therefore surprising that the process of the invention results in dry cured sodium and potassium bicarbonate products that are free-flowing and easy to handle. The bicarbonate feed for the process of the invention is generally dry and the cured bicarbonate is also dry. However, if the bicarbonate feed for the process is slightly moist, it is possible that the cured bicarbonate will be drier than the bicarbonate feed—a truly surprising occurrence.

This invention relates to a process for the curing of bicarbonate salts and, more particularly, for reducing the amount of reactant carbonate salt on the surface of the bicarbonate that is produced by crystallization from the carbonating reaction vessel or by any other means. The invention also relates to a dry carbonation technique for reacting the carbonate on the bicarbonate with carbon dioxide and condensed water vapor to produce the bicarbonate in substantially pure dry form.

It is among the objects of the present invention to provide a curing process that does not require the addition of liquid water or operation under conditions that result in the formation of wet reaction products and require increased drying and/or other handling costs. It is an object of the invention to provide a curing process for reducing the amount of reactant carbonate salt on the surface of product bicarbonate salt without adding any liquid water, and thereby improve product purity and reduce caking tendency. It is a further object of the invention to provide a curing process that can be readily added to an existing plant for a relatively modest capital outlay. A further object is to provide a curing process that uses a dry product bicarbonate as the starting material for the process of the invention and produces a dry cured product. It is a still further object of the invention to provide a curing process that has a stable control scheme with a minimal risk of over-wetting the product. It is also an object to provide a process that is relatively quick in accomplishing the foregoing objects. For example, we have operated the process on a continuous basis and achieved residence times on the order of 10 to 12 minutes.

These and other objects and advantages of the present invention will be apparent from the following description.

SUMMARY OF THE INVENTION

In accordance with the present invention, there is provided a process for curing, or reducing the amount of residual carbonate having the formula $M_2CO_3$ on a bicarbonate having the formula $MHCO_3$, wherein M is an alkali metal, particularly sodium or potassium, which comprises the steps:

(a) feeding the dry bicarbonate into a reaction zone, (b) introducing into the reaction zone carbon dioxide gas saturated with water vapor at a temperature $T_1$ controlled as described in step (d), (c) turbulently mixing the bicarbonate and the carbon dioxide gas saturated with water vapor, (d) measuring the temperature $T_2$ of the carbon dioxide stream leaving the reaction zone and controlling temperature $T_1$ so as to result in a drop in temperature from $T_1$ to $T_2$ that is calculated to condense a controlled amount of water vapor sufficient to supply exactly enough water to accomplish the reaction but no detrimental excess, (e) and reacting the bicarbonate, carbon dioxide, and water vapor, in the substantial absence of liquid water, for a sufficient time to produce dry cured bicarbonate product with less carbonate content and not requiring a separate drying step.

High conversions of the residual carbonate to the desired bicarbonate are achieved, with the bicarbonate being produced in dry form. The reaction may be carried out under atmospheric pressure, thereby avoiding the necessity of utilizing any high-pressure equipment. Moreover, additional capital investment and/or energy expenses for materials handling or drying of the bicarbonate product are unnecessary.

Among the many advantages of the invention may be cited:

A. The process of the invention may be easily added to an existing plant for a low capital outlay.

B. The process of the invention uses dry bicarbonate as the starting material and produces a purer dry bicarbonate product.

C. The process of the invention uses a stable temperature control scheme and as a result there is minimal risk of over-wetting the product.

D. The process of the invention is relatively rapid; in many cases it can be accomplished in only 10 to 12 minutes residence time for the bicarbonate in the reactor.

BRIEF DESCRIPTION OF THE DRAWING

The invention will be more fully described in connection with the preferred embodiments described below and in the accompanying FIG. 1, which is a flow diagram of one embodiment of the process of the invention.

DETAILED DESCRIPTION OF THE INVENTION

Figure 1:
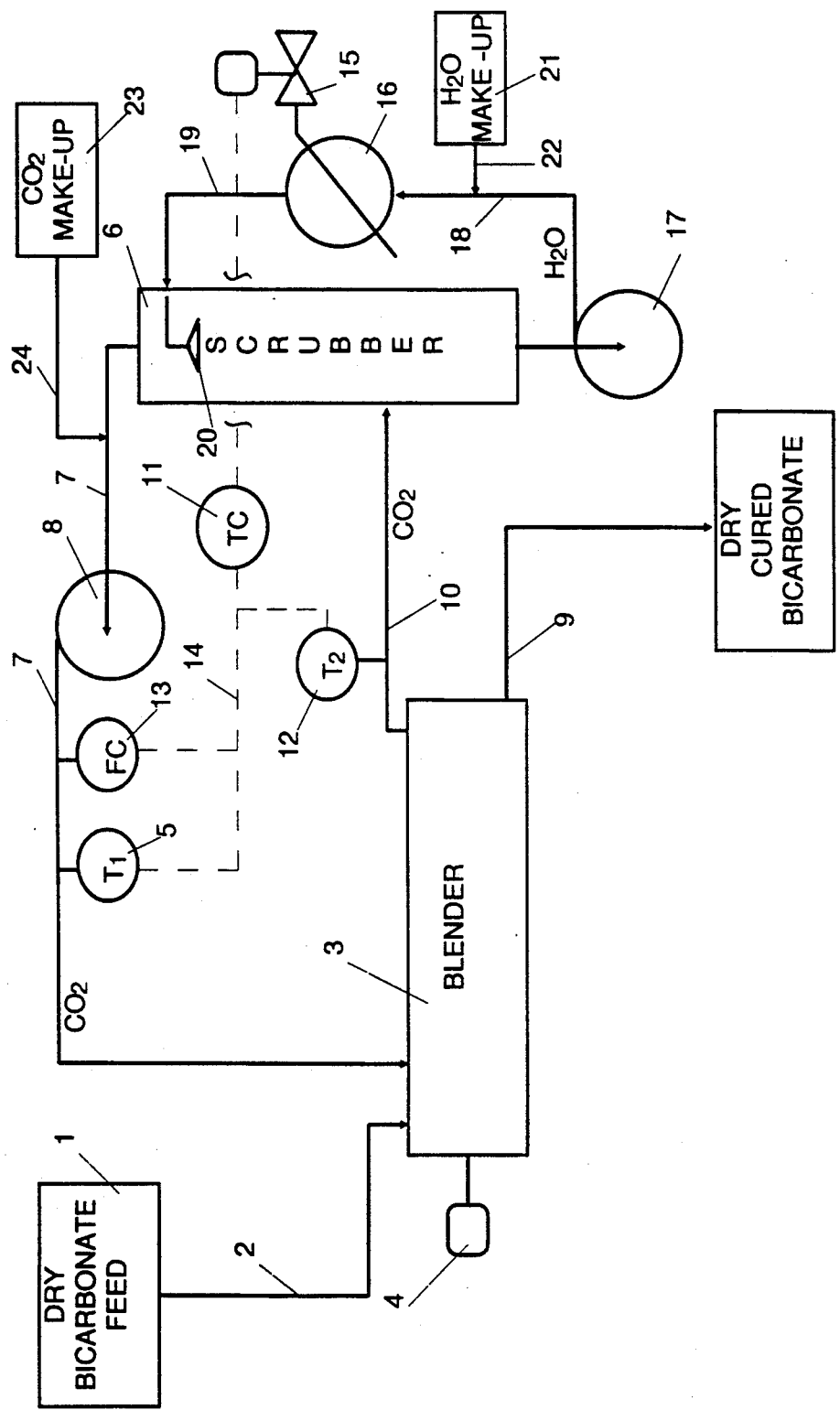

The curing process of the invention converts residual carbonate on bicarbonate salts to additional bicarbonate without waste and at high efficiency. The following reaction occurs in the process of the invention:

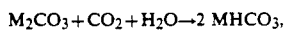

$$M_2CO_3 + CO_2 + H_2O \rightarrow 2\ MHCO_3,$$

wherein M is an alkali metal, e.g., sodium or potassium. For the sake of simplicity in the above reaction, the carbonate salt is denoted as having the formula $M_2CO_3$. However, the carbonate may be in the form of other salts such as the sesquicarbonate salt, Wegscheider's salt, the monohydrate salt or the calcined ash. The key to the process of the invention is adding exactly enough water to accomplish the reaction but no detrimental excess. This is accomplished by controlling the temperature of the humid $CO_2$ used in the reaction. The $CO_2$ is saturated with water at a temperature $T_1$, which is controlled to be higher than the temperature $T_2$ in the reaction zone so as to condense out the exact amount of water needed in the reaction to convert carbonate to bicarbonate. The $CO_2$ gas is recirculated between the bicarbonate contacting equipment and a wet scrubber, which removes any dust and also humidifies the $CO_2$ gas. The temperature of the gas leaving the bicarbonate contactor [e.g., a blender] is measured, and scrubber temperature is controlled so that the $CO_2$ gas entering the contactor is a known temperature higher than the $CO_2$ leaving. That temperature difference causes the condensation of the stoichiometric amount of water vapor required for the reaction, because the $CO_2$ is substantially saturated at all times. A programmable controller measures gas flow and both temperatures $T_1$ and $T_2$ and controls temperature $T_1$ so that the temperature drop from $T_1$ to $T_2$ results in the condensation of enough water vapor to provide the exact amount of water needed to effect curing without wetting the product. Usual reaction times for the process of the invention are about 10 to 12 minutes for substantial throughputs.

The bicarbonate feed to the reactor is usually at ambient temperature or it may be at a temperature slightly higher than ambient if it is fed to the curing reactor directly after a carbonation reaction. In theory, there is no limitation on the temperatures that may be employed in the curing reaction of the invention. However, in ordinary practice, $T_1$ may be controlled at a temperature of from about 30° C. to about 60° C., and $T_2$ may vary from about 2° C. to about 10° C. lower than $T_1$.

The reaction is carried out in the presence of excess amounts of carbon dioxide and water vapor. From the excess carbon dioxide, some of the carbon dioxide reacts to cure the bicarbonate; the unreacted carbon dioxide exits the reactor and is recycled. From the excess water vapor, the stoichiometric amount of water necessary to cure the bicarbonate is condensed for reaction with the carbonate on the surface of the bicarbonate; the unreacted water vapor exits the reactor with the carbon dioxide and is recycled. It is unnecessary to incorporate inert gases in the reaction medium. On the other hand, if desired, the feed gas may contain up to about 75% by volume air, nitrogen, or other inert gas.

The carbonation is carried out under turbulent mixing conditions to insure thorough contact of the dry bicarbonate particles containing residual carbonate with the gaseous reactants in order to cure the bicarbonate, with the condensation of a controlled amount of water. The water required for the reaction is thus entirely provided from the gas phase. The desired turbulent mixing system may be provided by use of any conventional reactor providing gas-solid contact turbulence, e.g., fluidized bed reactors, mechanically agitated reactors, e.g., blenders such as plow blenders, ribbon blenders or high shear mixers, pneumatic conveyors, classifying mills, or even bucket elevators and the like. The process may instead be carried out in particle size reduction or classification equipment.

Although the process of the invention may be conducted in batchwise fashion, possible difficulties in controlling the reaction leads one to the conclusion that it is preferred to conduct the process continuously. The process in which the reaction is conducted in a continuous manner may be controlled by a programmable temperature controller which:

A. receives (a) input from a temperature sensor indicating the temperature of the carbon dioxide saturated with water vapor that enters the reaction zone, (b) input from a temperature sensor indicating the temperature of the humid carbon dioxide that exits the reaction zone, (c) input from a flow controller indicating the flow of the carbon dioxide saturated with water vapor that enters the reaction zone, and B. controls the temperature of a wet scrubber used to recycle the humid carbon dioxide from the reaction zone so that the stoichiometric amount of water vapor required for the reaction condenses in the reaction zone corresponding to the flow sensed and the difference in the temperature of the carbon dioxide saturated with water vapor that enters the reaction zone and the temperature of the humid carbon dioxide that exits the reaction zone, thereby curing the bicarbonate in the reaction zone.

A preferred continuous process for conducting the process of the invention is illustrated in FIG. 1 and described as follows.

FIG. 1 is a schematic flow diagram of one embodiment of the invention. Dry bicarbonate is fed from hopper 1 through feed conduit 2 to plow blender 3, which has an internal agitator, not shown, that is turned by motor 4. Preferably, the bicarbonate feed has particle sizes of from about 20 to 1000 microns. $CO_2$ saturated with water vapor at temperature $T_1$ (sensed by temperature sensor 5) from scrubber 6 is introduced to the plow blender 3 through conduit 7 by blower 8. In plow blender 3, the temperature of the $CO_2$ saturated with water vapor drops from $T_1$ to $T_2$. That drop in temperature causes the stoichiometric amount of water required in the reaction to condense. That condensed water and some of the $CO_2$ react with the carbonate on the surface of the bicarbonate feed to yield a cured dry bicarbonate. Dry cured bicarbonate exits the plow blender 3 through conduit 9. Unreacted humid $CO_2$ at temperature $T_2$ (sensed by temperature sensor 12) exits the plow blender 3 through conduit 10, which conducts it back to the scrubber 6.

Programmable temperature controller 11 (TC) receives signals indicating plow blender 3 inlet gas temperature $T_1$ (sensed by temperature sensor 5), plow blender 3 outlet gas temperature $T_2$ (sensed by temperature sensor 12), and inlet saturated $CO_2$ gas flow from flow controller 13 (FC) through control circuitry 14, shown by dashed lines. Programmable temperature controller 11 (TC) contains an algorithm, based on psychrometry, which is familiar to one skilled in the art. The setpoint provided to the programmable temperature controller 11 (TC) by the operator represents the mass of water to be condensed per hour, and is based on the throughput of bicarbonate feed through plow blender 3 and the carbonate content of the bicarbonate feed determined by analysis. The programmable temperature controller 11 (TC) then adjusts the temperature of scrubber 6 by adjusting steam valve 15 from the steam source. Steam valve 15 directs steam to heat exchanger 16. Heat exchanger 16 heats the recycle water from the bottom of scrubber 6 that is pumped to heat exchanger 16 by pump 17 through pipeline 18. From heat exchanger 16, the heated recycle water flows through pipeline 19 to the scrubber nozzle 20 inside at the top of scrubber 6. Water is sprayed through the scrubber nozzle 20 downward and countercurrent to the flow of $CO_2$, which enters the scrubber 6 at a lower point. The water spray and the countercurrent flow of $CO_2$ serve to saturate the $CO_2$ with water vapor at temperature $T_1$. Thus inlet gas temperature $T_1$ (sensed by temperature sensor 5) is maintained greater than $T_2$ (sensed by temperature sensor 12) by just enough margin to condense out the prescribed stoichiometrically required amount of water in plow blender 3. Any drifting in outlet temperature $T_2$ (sensed by temperature sensor 12) or in gas flow (controlled by flow controller 13 [FC]) is automatically compensated for by the programmable temperature controller 11 (TC).

During the course of the reaction, water vapor in the system that is reacted is replaced by makeup water from source 21 and is supplied to pipeline 18 by pipeline 22, and $CO_2$ in the system that is reacted is replaced by makeup $CO_2$ from source 23 and is supplied to conduit 7 by conduit 24.

Preferred embodiments for carrying out the process of this invention are described in the following examples. Unless otherwise indicated, all parts and percentages given in the examples or in the preceding description are specified by weight and all temperatures are given in degrees Celsius.

EXAMPLE 1

The process employed was substantially as depicted in the schematic flow diagram of FIG. 1 and as described above in the discussion of FIG. 1. A plow blender was used for the gas-solid contact.

Sodium bicarbonate containing no detectable moisture and about 0.3% carbonate was fed to the process at a rate of several tons per hour. Although no effort was made to control bicarbonate or blender temperature, temperature $T_2$ remained in the range of from 35° to 50° C.; this temperature floated primarily because of incoming bicarbonate temperature. The controller 11 setpoint was adjusted to condense about 15 pounds of water per hour as was required stoichiometrically. With a constant gas recirculation rate of 125 actual cubic feet per minute (acfm), the controller 11 maintained temperature $T_1$ about 7° C. higher than temperature $T_2$. The sodium bicarbonate thus treated had no detectable moisture, as before, and a carbonate content of about 0.05%.

EXAMPLE 2

The process of Example 1 may be followed to cure other alkali metal bicarbonates that have residual carbonates on their surfaces. For instance, potassium bicarbonate containing residual surface carbonate and no detectable moisture is substituted for the sodium bicarbonate in Example 1 and the process repeated. The bicarbonate that results has greatly reduced carbonate on its surfaces and no detectable moisture.

It will be understood that the specific parameters of the preferred embodiments described hereinabove may be varied without departing from the scope of this invention. Accordingly, the preceding description should be construed as illustrative and not in a limiting sense.

What is claimed is:

1. A process for curing, or reducing the amount of residual carbonate having the formula $M_2CO_3$ on a bicarbonate having the formula $MHCO_3$, wherein M is an alkali metal, which comprises the steps:
   (a) feeding the dry bicarbonate into a reaction zone,
   (b) introducing into the reaction zone carbon dioxide gas saturated with water vapor at a temperature $T_1$ controlled as described in step (d),
   (c) turbulently mixing the bicarbonate and the carbon dioxide gas saturated with water vapor to insure thorough contact of said bicarbonate with said carbon dioxide gas saturated with water vapor,
   (d) measuring the temperature $T_2$ of the carbon dioxide stream exiting the reaction zone and controlling temperature $T_1$ so as to result in a drop in temperature from $T_1$ to $T_2$ that is calculated to condense a controlled amount of water vapor sufficient to supply exactly enough water to accomplish the reaction but no detrimental excess,
   (e) and reacting the bicarbonate, carbon dioxide, and condensed water vapor, in the substantial absence of excess liquid water, for a sufficient time to produce dry cured bicarbonate product with less carbonate content and not requiring a separate drying step.

2. The process of claim 1, wherein M is sodium or potassium.

3. The process of claim 1, wherein the carbonate is present in the form of the sesquicarbonate salt, Wegscheider's salt, the monohydrate salt or the calcined ash.

4. The process of claim 1, wherein the reaction is carried out in a fluidized bed reaction zone.

5. The process of claim 1, wherein the reaction is carried out in a mechanically agitated reaction zone.

6. The process of claim 1, in which the reaction is carried out in particle size reduction or classification equipment.

7. The process of claim 1, in which the bicarbonate feed has particle sizes of from about 20 to 1000 microns.

8. The process of claim 1, in which the reaction is conducted in a continuous manner and is controlled by a programmable temperature controller which:
A. receives (a) input from a temperature sensor indicating the temperature of the carbon dioxide saturated with water vapor that enters the reaction zone, (b) input from a temperature sensor indicating the temperature of the humid carbon dioxide that exits the reaction zone, (c) input from a flow controller indicating the flow of the carbon dioxide saturated with water vapor that enters the reaction zone, and
B. controls the temperature of a wet scrubber used to recycle the humid carbon dioxide from the reaction zone so that the stoichiometric amount of water vapor required for the reaction condenses in the reaction zone corresponding to the flow sensed and the difference between the temperature of the carbon dioxide saturated with water vapor that enters the reaction zone and the temperature of the humid carbon dioxide that exits the reaction zone.

* * * * *